(No Model.)

J. STERN.
GARMENT CLASP.

No. 588,841.

Patented Aug. 24, 1897.

WITNESSES:
J. A. Rennie
Theo. G. Hoster

INVENTOR
J. Stern.
BY
[signature]
ATTORNEYS.

UNITED STATES PATENT OFFICE.

JOSEPH STERN, OF NEW ORLEANS, LOUISIANA.

GARMENT-CLASP.

SPECIFICATION forming part of Letters Patent No. 588,841, dated August 24, 1897.

Application filed May 22, 1896. Serial No. 592,562. (No model.)

*To all whom it may concern:*

Be it known that I, JOSEPH STERN, of New Orleans, in the parish of Orleans and State of Louisiana, have invented a new and Improved Garment-Clasp, of which the following is a full, clear, and exact description.

The object of the invention is to provide a new and improved garment-clasp which is simple and durable in construction, more especially designed for use on the opening flaps of trousers, and arranged to permit of conveniently fastening the staple in place without stitching.

The invention consists of certain parts and details, as will be fully described hereinafter and then pointed out in the claim.

Reference is to be had to the accompanying drawings, forming a part of this specification, in which similar characters of reference indicate corresponding parts in all the figures.

Figure 1:
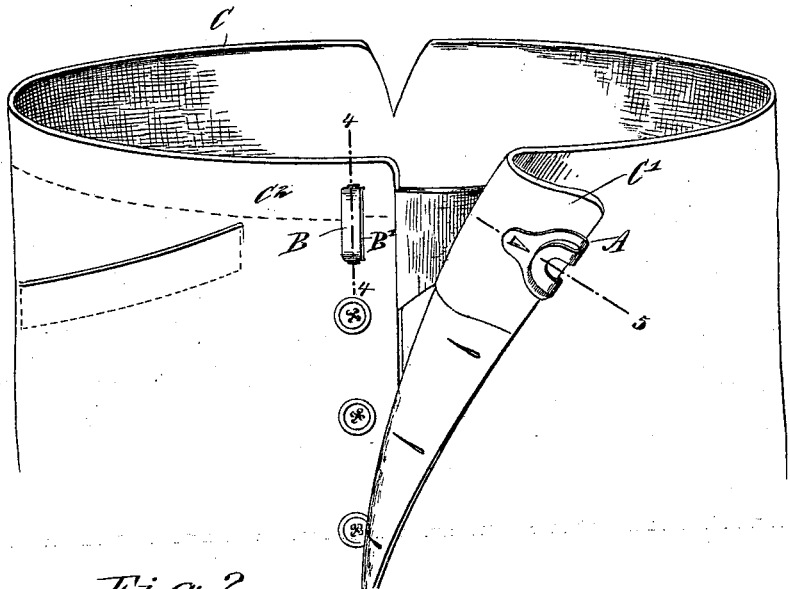
Figure 2:
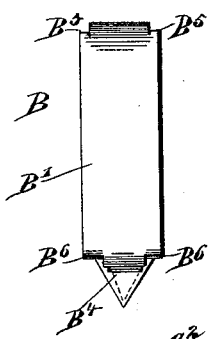
Figure 3:
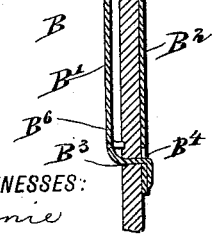

Figure 1 is a perspective view of the improvement as applied. Fig. 2 is an enlarged front elevation of the staple. Fig. 3 is an enlarged cross-section of the staple as applied and on the line 4 4 of Fig. 1.

The improved garment-clasp is provided with a hook A and a staple B, secured to the flaps $C'$ and $C^2$ of the trousers C, as illustrated in Fig. 1.

The hook A is adapted to engage the staple B, which latter is also made of a single piece of sheet metal bent upon itself to form two members $B'$ and $B^2$, of which the member $B'$ is provided at its free end with a tongue $B^3$, adapted to engage an opening $B^4$ in the free end of the other member $B^2$.

The free ends of the member $B^2$ and the tongue $B^3$ are pointed, so that the member $B^2$ can be readily passed through the material forming the flap $C^2$, as indicated in Fig. 3, to bring the two members on opposite sides of the cloth. The tongue $B^3$ is then passed through the cloth and the opening $B^4$ and clenched on the outer face of the free end of the member $B^2$, as plainly indicated in Fig. 3, to securely fasten the staple in place on the flap $C^2$.

The member $B'$ is provided near its ends with inwardly-extending lugs $B^5$ and $B^6$, adapted to engage the outer face of the flap $C^2$, so as to hold the member $B'$ a suitable distance from the face of the flap $C^2$ to permit the hook A to readily engage the member $B'$ whenever it is desired to fasten the two flaps $C'$ and $C^2$ together.

As illustrated in the drawings, the hook A is arranged on the edge of the flap $C'$ and is disposed horizontally, while the staple B is arranged vertically and a suitable distance from the edge of the flap. Thus when the hook A engages the staple B the two flaps overlap in the usual manner.

Having thus described my invention, I claim as new and desire to secure by Letters Patent—

A garment-clasp, provided with a staple made from a single piece of sheet metal bent upon itself to form two members, one of which is provided at its free end with a pointed tongue adapted to engage an opening in the pointed free end of the other member, and one of the members being also provided with lugs extending inwardly to rest on the cloth to hold this member a suitable distance from the face of the cloth, substantially as shown and described.

JOSEPH STERN.

Witnesses:
   FELIX J. DREYFOUS,
   ALBERT GUILBAULT.